March 15, 1932. L. S. MORSE 1,849,730
TIRE PRESSURE INDICATOR
Filed May 4, 1927 3 Sheets-Sheet 1
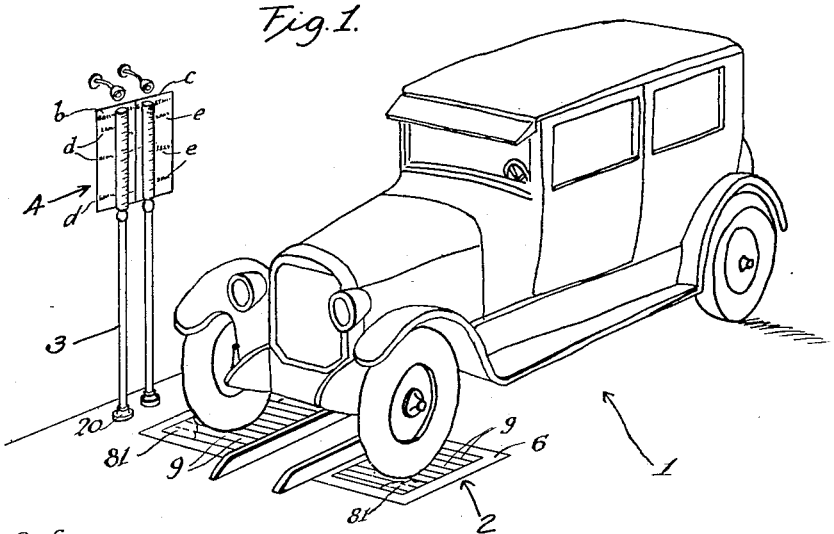
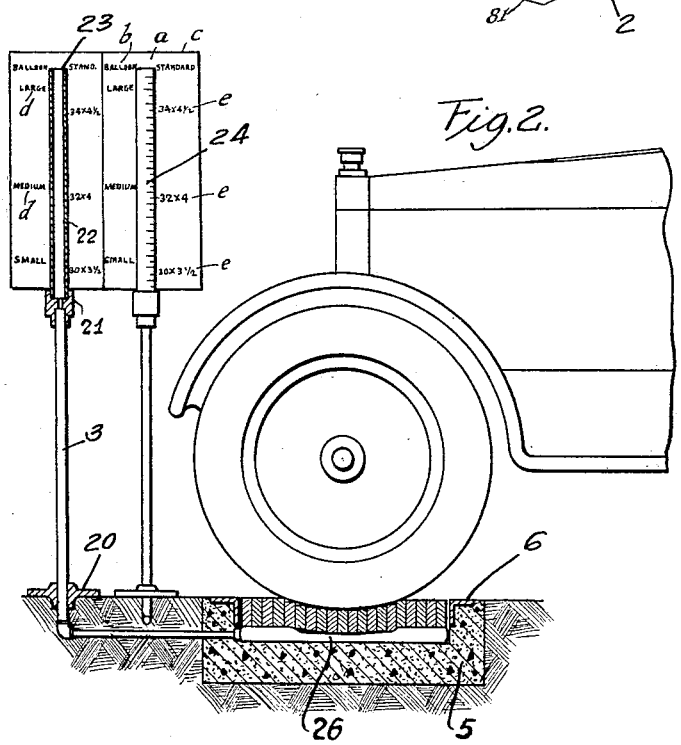
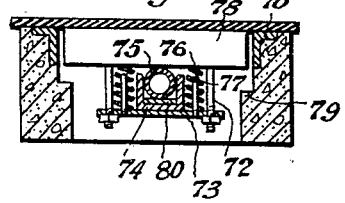
INVENTOR
L. S. Morse.
By Hazard and Miller
ATTORNEYS March 15, 1932. L. S. MORSE 1,849,730
TIRE PRESSURE INDICATOR
Filed May 4, 1927  3 Sheets-Sheet 2
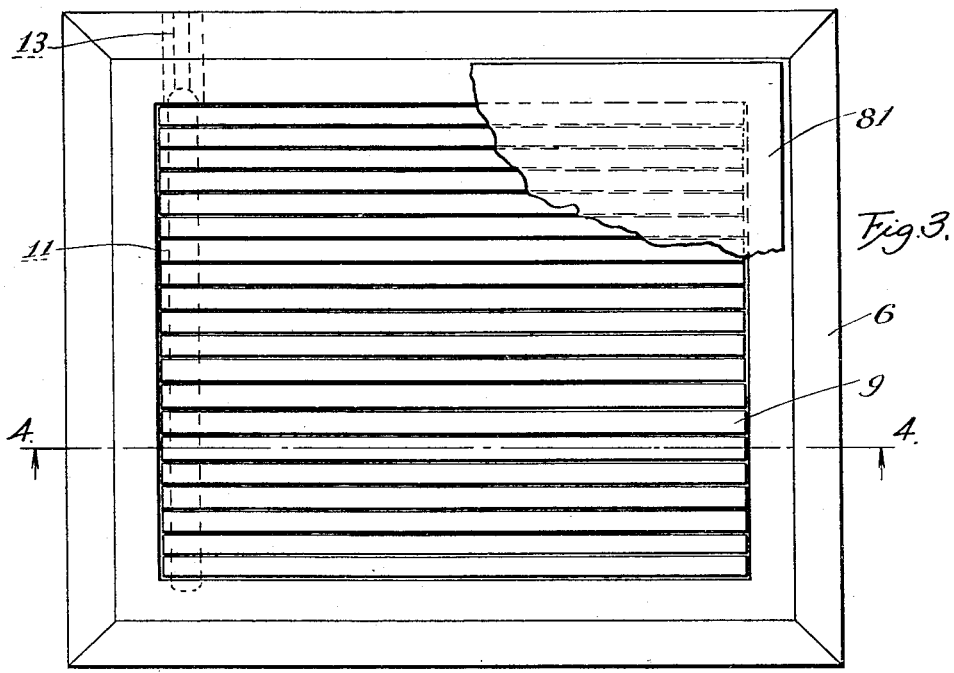
Fig.3.
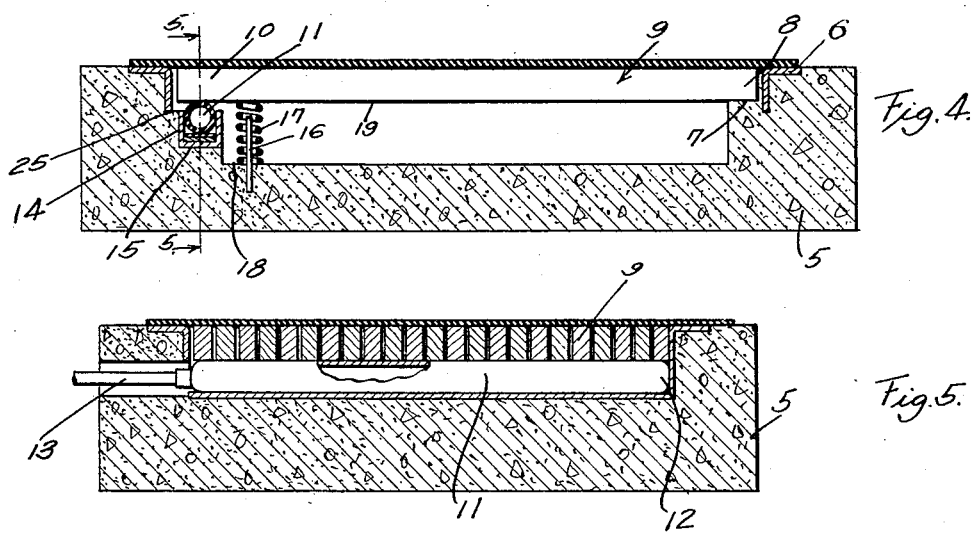
Fig.4.
Fig.5.
INVENTOR
By L. S. Morse.
Hazard and Miller
ATTORNEYS March 15, 1932.   L. S. MORSE   1,849,730
TIRE PRESSURE INDICATOR
Filed May 4, 1927   3 Sheets-Sheet 3

INVENTOR
By L. S. Morse.
Hazard and Miller
ATTORNEYS

Patented Mar. 15, 1932

1,849,730

UNITED STATES PATENT OFFICE

LULAN S. MORSE, OF OCEAN PARK, CALIFORNIA

TIRE PRESSURE INDICATOR

Application filed May 4, 1927. Serial No. 188,707.

My invention is a tire pressure indicator to indicate correct or incorrect inflation of a tire by means of the flexing of a tire.

The invention of this application may be considered as an improvement on my application for tire pressure indicators filed September 7, 1926, Serial No. 133,852.

An object of my invention is to utilize a hydraulic fluid, such as a liquid, which through a mechanism operated by the flexing of a tire on a platform or the like will indicate on a gauge a reading, such reading being interpreted to ascertain the approximate inflation of a tire and form a quick indication as to under or over inflation, or the correct inflation of such tire.

A more detailed object of the present invention is the use of a structure in which a liquid is displaced through the medium of a plurality of slats or the like of a platform, the tire resting on such slats, whereby the liquid acts on a gauge and this gauge gives the interpretation as to the approximate pressures and therefore a reading relating to the inflation.

In constructing my invention, in one form thereof I have a suitable platform preferably mounted on ground level so that an automobile may be readily run thereon, with a tire on the slats, and a certain number of the slats will be depressed by the tire, the greater the flexure of the tire the greater the number of slats will be depressed. The slats operate a hydraulic mechanism in their depression and from such mechanism the hydraulic fluid is conveyed to and actuates a gauge, giving a visible reading to interpret the flexure and therefore the inflation of the tire.

In one form of my invention I utilize a flexible rubber tube on which the slats bear, such tube being filled with the liquid and the variation in the number of slats depressed causes a variation in the displacement of the liquid.

In another form of my construction I utilize a series of pistons, there being one piston for each of the slats, these pistons being mounted in cylinders and these cylinders having a common liquid connection so that the variation in the number of pistons depressed causes a variation in the volume of the cylinders to hold the liquid, such liquid being forced to a mechanism operating a gauge.

My invention will be more readily understood in its various aspects from the accompanying drawings, in which:

Figure 1 is a perspective view of an installation utilizing my tire pressure indicator, showing the front wheels of an automobile on the platforms.

Figure 2 is a side elevation partly broken away showing the construction of a platform with a plurality of slats, such slats pressing a collapsible tube which is filled with the liquid, the displaced liquid giving a reading in vertical gauge glasses according to the rise and fall of such liquid.

Figure 3 is a plan view of the platform indicating the collapsible tube in dotted lines on one side.

Figure 4 is a vertical section on the line 4—4 of Fig. 3 in the direction of the arrows.

Figure 5 is a vertical section on the line 5—5 of Fig. 4 in the direction of the arrows through the tube, showing such tube partly in elevation.

Figure 9 is a longitudinal section partly in elevation of still another alternative form.

Fig. 10 is a section on the line 10—10 of Fig. 9 in the direction of the arrows.

Figure 6:
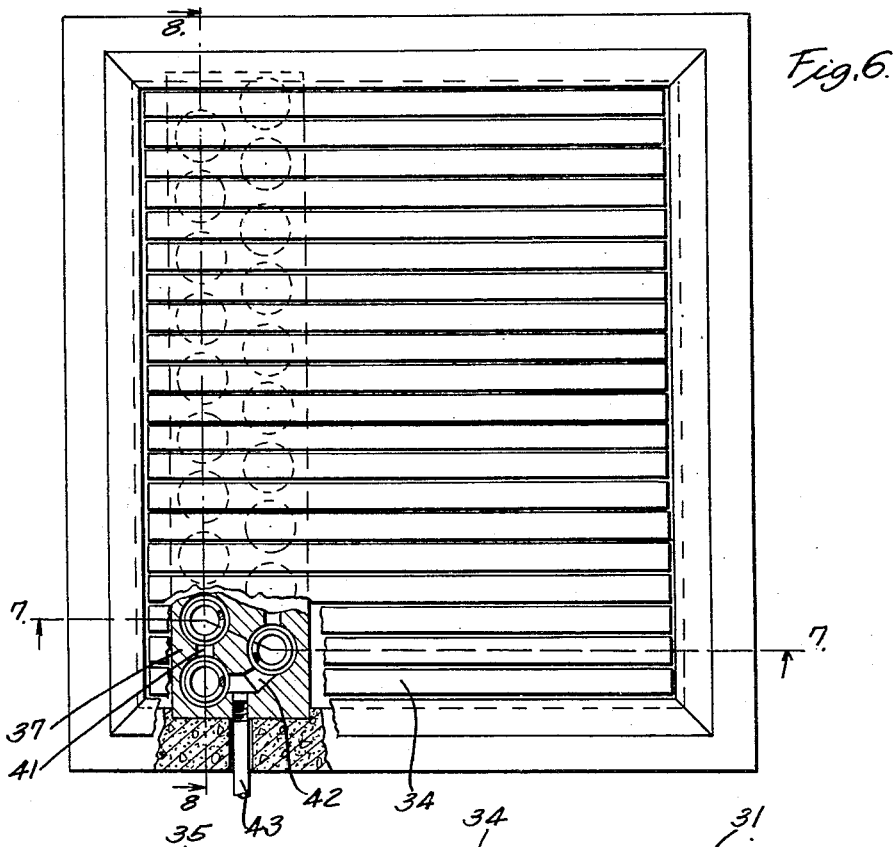
Figure 6 is a plan view of a modified construction, partly broken away, showing a system employing hydraulic cylinders with pistons operating therein, the pistons being displaced by the movement of the slats.

Referring first to the construction of Figs. 1 through 5, a runway is indicated by the numeral 1 on which the automobile may approach the pressure indicating device and in the runway are situated a pair of platforms indicated generally by the numeral 2, and connected to each runway is a standpipe 3 having a gauge 4 thereon. Thus, as illustrated in Fig. 1, each of the platforms is to accommodate a wheel of the automobile and each gauge is connected to a platform so that an indication as to both tires may be obtained at the same time.

The platforms are preferably constructed with a substantial base 5 formed of concrete or the like in which is set a metallic angular rim 6. The base is provided with a shoulder 7 forming a fixed support for one end 8 of the slats 9. The other end 10, designated the free end of the slats, rests normally on a flexible tube 11, this being preferably a hose which is closed at one end 12 and connected to a conduit 13 at the other end. This tube is preferably located in a channel 14 mounted on a shelf 15 in the base. In order to elevate the slats to their normal upper position a series of pins 16 are molded in the base and have compression springs 17 coiled there-about, such springs bearing on a second shelf 18 and on the under surface 19 of the slats, there being one spring to each slat.

The gauge construction of Figs. 1 and 2 comprises, as above mentioned, a standpipe 3 connected to the conduit 13, this standpipe extending through a supporting ferrule 20 in the runway and on the top of the standpipe there is a coupling 21 from which extend the gauge glass 22, these glasses having an open top 23 and with graduations 24 thereon.

The manner of operation and functioning of my pressure indicator as above described is substantially as follows:

When an automobile is run with two wheels resting on the two platforms it will be apparent that some of the slats would be depressed and as these are quite readily depressed the greater the flexure of the tire, that is the softer the tire, the more slats would be depressed, and if the tire is hard and does not flatten to a great extent a fewer number of slats would be depressed. The slats are limited in their downward movement by a shoulder 25 adjacent the channel 14 or by the upper edges of such channel, hence the tube cannot be completely depressed but may be deflected a certain amount as indicated by the numeral 26 in Fig. 2. This deflection causes a displacement of the liquid in the collapsible tube, forcing such liquid through the duct 13 upwardly through the standpipe 3 and causes the rise and fall of the liquid in the gauge glasses 24, the liquid in these glasses being colored if desired to show more clearly through the glass.

The glasses may be graduated in any suitable manner but I find a satisfactory way is to have regularly spaced graduations thereon. With my equipment I provide a table derived empirically showing the proper height of the column in the gauge glasses for different sized tires when they are properly inflated, this table having to do with tires of different diameters and of different through measurements, the through measurements being from side to side of the tire. The table would also be for both standard and balloon tires. The table would also indicate readings for the different sized tires which show under inflation and the approximate degree, or over inflation and the approximate degree. A factor may also be employed having to do with the approximate weight carried by the tires which would cause a greater flexure than the same sized tire with a lighter weight. By this means, therefore, it will be seen that a quick check up may be obtained as to whether tires are properly inflated and if not in which direction the inflation is improper, whether by too low or too great an amount of air in the tires.

Suitable charts to indicate the registry of the inflation of tires are illustrated in Figs. 1 and 2, in which charts, a may be mounted on the wall or a suitable support back of the glasses. Each of these charts has a column b for balloon tires and another column c for standard tires. The column b is graduated by indicia d designating large, medium and small tires. The column c has indicia e designating tires approximately by size, such as 34 x 4½, 32 x 4, and 30 x 3½.

Presuming a car with balloon tires is run on the scales, then the attendant may judge whether these are large, medium or small size. If the liquid rises to the level approximately opposite the word indicia representing the size tire, it may be considered that such tire is properly inflated. However, if the liquid rises above such indicia the tire is considered under inflated, and if the liquid rises below the indicia the tire is over inflated. The same scheme of operation applies to the standard tires, the operator noting the approximate size of the tires, also noting if the liquid is opposite the different indicia or above or below, indicating substantially correct, insufficient or over inflation.

Figure 7:
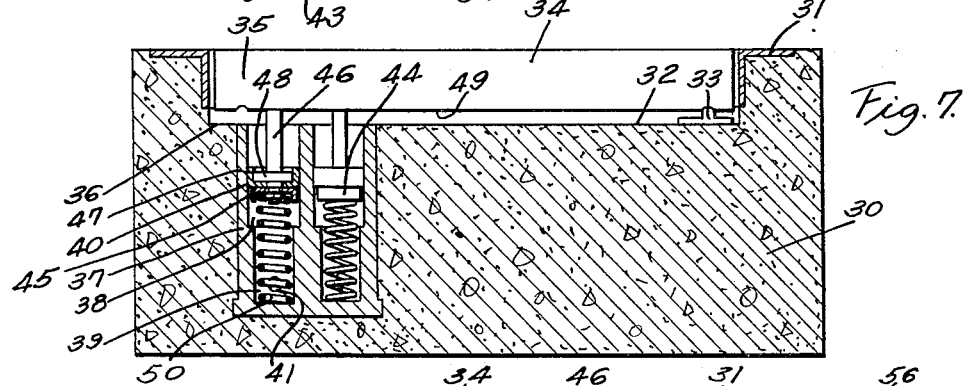
Figure 7 is a vertical section on the line 7—7 of Fig. 6 in the direction of the arrows.
Figure 8:
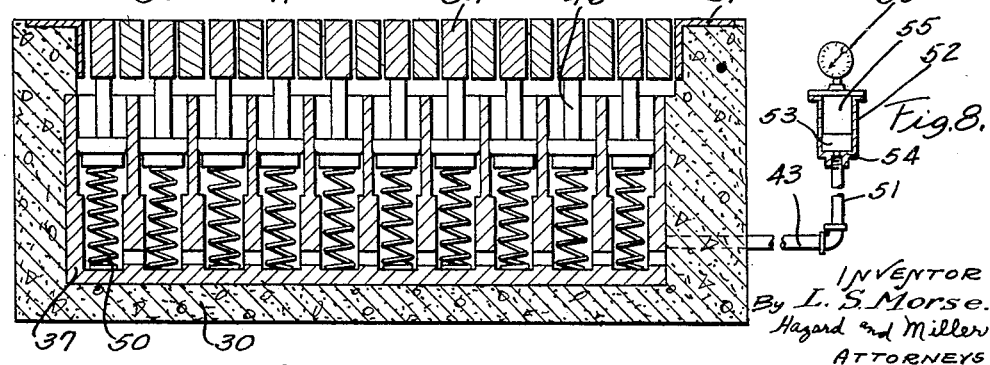
Figure 8 is a vertical section on the line 8—8 of Fig. 6 in the direction of the arrows, showing some of the cylinders in section.

In the construction of Figs. 6, 7 and 8, I utilize a relatively heavy concrete base 30 which may be set in the runway, this base having an angular rim 31. The base has a recess 32 and on the bottom of this recess is secured a pivot bar 33. A series of slats 34 each having one end mounted on the pivot bar to allow tilting and the free end 35 may be depressed until it strikes a shoulder 36 on the opposite side of the base.

A metal casting 37 is embedded in the base and has a series of cylindrical bores 38 therein. These bores are indicated as having a lower section 39 of smaller diameter than the upper section 40. As shown in Figs. 6 and 7, these bores are in two lines considered lengthwise of the casting 37 and are staggered. Liquid passages 41 connect the base of each of the cylindrical bores in each row and these are connected by a common passage 42 which leads to a liquid duct 43.

In each of the bores there is mounted a piston 44 which may be of any suitable type and is shown with a ring 45 with a downwardly turned rim bolted to a piston rod 46 by a nut and on top of this there is a cupped washer 47 with a ring 48 to maintain the washer expanded. Each piston rod contacts with the lower surface 49 of a slat, therefore, when a wheel rests on the platform a certain number of slats are depressed, these varying in number in accordance with the flatness or flexure of a tire, causing the depression of a greater or lesser number of pistons. These pistons are normally forced into their upper position by coiled springs 50 mounted in the lower bore of the cylinder.

The liquid duct 43 is connected to a standpipe 51 which discharges into a cylinder 52 and in this cylinder there is a sliding piston 53. The lower part of the cylinder forms a liquid chamber 54 for the liquid connected to the cylinders operated by the slats and the upper part forms a compression chamber 55 for a liquid or gas, this liquid or gas being connected to a gauge 56 having a pointer or the like.

The manner of operation and functioning of my indicator of Figs. 6, 7 and 8, is substantially as follows:

As a greater or a lesser number of slats are depressed in accordance with the flatness or flexure of a tire, the total amount of liquid in the cylinders is decreased, the displaced liquid flowing through the duct 43, the standpipe 51, into the lower part 54 of the cylinder 52, thus elevating the piston 53 and causing a compression in the compression chamber 55, thereby giving an indication on the gauge. Hence by this construction the displacement of liquid caused by the operation of the slats gives a pressure indication in the gauge. By a table or the like derived empirically this gauge may be graduated to indicate a correct or incorrect flexure of tires of certain sizes and diameters and certain sizes through, that is from side to side, whether for balloon or standard tires. Preferably, however, the gauge indicates pressures in pounds or the like and by an empirical table these readings may be interpreted as to different sized tires to show the correct or incorrect inflation and if incorrect whether by too little or too much air in the tires.

It is to be understood that with either of the types of platforms, that is the type using the compressible and collapsible tube, or that having the cylinders, I may use either type of gauge.

In the construction of Figs. 9 and 10 I mount a frame 70 in a base 71, this frame being shown as angular, and from the frame have suspending bolts 72, such bolts suspending a plate 73. On this plate I position a channel or trough 74 in which is placed a collapsible tube 75.

A pair of pins 76 are secured to the plate 73 extending upwardly and have coiled compression springs 77 wound thereabouts. Each pair of springs supports a slat 78. The tube 75 is connected to the conduit 13 and leads to a gauge, as in the other constructions.

The manner of functioning and use of my structure as illustrated in Figs. 9 and 10 is substantially as follows:

When a vehicle wheel is run on the platform transversely to the slats, these slats are depressed and bear down on the collapsible tube 75. I have a marking on the upper surface of the slats to indicate the proper centering of the wheel over the tube 75 but it is immaterial if this is slightly departed from. Each slat depressed may have a downward motion until it rests on the upper edge of the channel 74 or on the top of the pins 76 and as the collapsible tube 75 is filled with a liquid, this liquid is displaced, and the quantity displaced depends on the number of slats which are pressed down. In case the vehicle should run on the platform too far to one side, I provide shoulders 79 on the base 71 to give a limiting action. It will be noted by this construction that it is not necessary to have any particular guide structure for the slats as these are placed in practice sufficiently close together so that one slat forms a guide for the next adjacent slats in their vertical movement and, as the slats are supported in their center, they do not have any pivoting action as in the construction of Figs. 3, 4 and 5, and still use the principle of having the collapsible tube filled with a hydraulic liquid.

If desired I may insert one or more shims 80 underneath the collapsible tube 75, and in order to prevent the water from passing through the slats I utilize a rubber mat 81 which may be stretched completely across the slats and beyond the side frames 70.

Various changes may be made in the principles of my invention without departing from the spirit thereof, as set forth in the description, drawings and claims.

I claim:

1. A tire pressure indicator comprising in combination a platform having a series of depressible devices thereon, a hydraulic mechanism operated upon by each device, and a gauge actuated by the hydraulic fluid of the hydraulic mechanisms.

2. A tire pressure indicator comprising in combination a platform having a series of depressible slats, a hydraulic mechanism operated upon by each slat in depression to displace some of the hydraulic fluid in such mechanism, and a gauge connected to the hydraulic mechanisms.

3. A tire pressure indicator comprising in combination a platform having a series of parallel pivotally mounted slats, a hydraulic mechanism containing a hydraulic fluid, means operated upon by each slat in depression to displace some of said fluid, a pipe connected to the hydraulic mechanism through which the displaced fluid may flow, and a gauge connected to the pipe, said slats extending completely across the platform.

4. A tire pressure indicator comprising in combination a platform having a series of parallel depressible slats, a hydraulic mechanism containing a hydraulic fluid, means normally maintaining each slat elevated, the slats when depressed operating upon the hydraulic mechanism to displace some of the hydraulic fluid, means to limit the movement of the slats, a pipe connected to the hydraulic mechanism, and a gauge connected to the pipe, the hydraulic fluid actuating the said gauge.

5. A tire pressure indicator comprising in combination a platform having a series of depressible elements to be engaged by a tire, a structure having a series of cylinders therein with hydraulic fluid in the cylinders, the cylinders each having a piston with a piston rod, each piston rod being positioned to be engaged by a depressible device, there being a common connection between the cylinders for the hydraulic fluid, and a gauge to indicate the displacement of the hydraulic fluid by the depression of the depressible devices.

6. A tire pressure indicator comprising in combination a platform having a series of depressible slats, a structure having a series of cylinders interconnected and having hydraulic fluid in the cylinders, pistons mounted in said cylinders having piston rods, each piston engaging a slat to be depressed thereby, means to elevate said pistons, and a gauge connected to said cylinders to indicate displacement of the hydraulic fluid.

7. A tire pressure indicator comprising in combination a platform having a series of depressible slats, a structure underneath the platform having a series of cylinders interconnected, each cylinder having hydraulic fluid and a piston therein with a piston rod, each piston rod engaging the under surface of a slat to be depressed thereby, a gauge cylinder connected to said cylinders, a piston in said gauge cylinder to be displaced by hydraulic fluid flowing from the said cylinders, there being a compression chamber in the gauge cylinder having a fluid, and a gauge connected to the compression chamber to be actuated by the said latter fluid.

8. A tire pressure indicator comprising in combination a platform having a plurality of depressible devices thereon, a plurality of cylinders each having a hydraulic fluid therein, each cylinder having a piston, operative connections between the pistons and the depressible devices whereby each depressible device has a connection to a corresponding piston and the operation of each piston actuates the hydraulic fluid, there being a connection for the hydraulic fluid from each of the cylinders, and a gauge actuated by the hydraulic fluid in the said connection.

9. A tire pressure indicator comprising in combination a platform having a plurality of depressible slats, a plurality of cylinders each having hydraulic fluid therein, and a piston for each cylinder, an operative connection between the pistons and the slats whereby each piston is connected to a corresponding slat and on depression of each slat a corresponding piston is depressed and the hydraulic fluid in the cylinder having such piston is acted upon, there being a hydraulic connection from the cylinders, and a gauge in such connection.

10. A tire pressure indicator comprising in combination a platform having a series of depressible slats, a piston actuated by each slat and operating in a cylinder having hydraulic fluid therein, a spring means normally maintaining each slat elevated, each slat when depressed displacing the hydraulic fluid in the cylinder through the medium of its piston, means to limit the movement of the slats, a pipe connected to the cylinders, and a gauge connected to the pipe, the hydraulic fluid actuating the said gauge.

11. A tire pressure indicator comprising in combination a platform having a series of parallel depressible slats and a hydraulic means acted upon by any two or more of said slats to show the flexure of a tire, said slats extending completely across the platform.

12. A tire pressure indicator comprising in combination a platform having a series of parallel depressible slats pivotally mounted at one end, hydraulic means normally supporting all of the slats in an elevated position, means to stop the movement of all of the slats in the depressed position, and hydraulic means operated upon by the lowering of any two or more slats to indicate the flexing of a tire.

13. A tire pressure indicator comprising in combination a platform having a plurality of vertically disposed, movable, parallel slats, any consecutive series of said slats being depressible, hydraulic means operated upon by the depression of each slat, and an indicating means actuated by the hydraulic means to indicate the flexure of a tire, said slats extending completely across the platform.

14. A tire pressure indicator comprising in combination a platform having a plurality of transverse parallel slats placed side by side, a resilient means normally maintaining each slat in an elevated position, a hydraulic means combined for action with each slat, whereby a hydraulic fluid is compressed by the downward movement of any series of adjacent slats, and an indicating means connected to the hydraulic means to indicate the flexure of a tire, said slats extending completely across the platform.

In testimony whereof I have signed my name to this specification.

LULAN S. MORSE.